H. Barker.
Broom Head.

Nº 63,983.   Patented Apr. 23, 1867.

Witnesses
Charles Herron.
W. M. Hervey

Inventor
Hiram Barker,
By D. E. Somes, &c. his Attorneys

United States Patent Office.

HIRAM BARKER, OF AURORA, INDIANA.

Letters Patent No. 63,983, dated April 23, 1867.

---

IMPROVED BROOM-HEAD.

---

The Schedule referred to in these Letters Patent and making part of the same.

---

TO ALL WHOM IT MAY CONCERN:

Be it known that I, HIRAM BARKER, of Aurora, in the county of Dearborn, and State of Indiana, have invented a new and useful improvement in Broom-Heads; and I do hereby declare the following to be a full, clear, and exact description thereof, reference being had to the annexed drawings, making part of this specification, in which—

The nature of my invention consists in so combining the parts of the head with each other and with the binding wire or cord as that a more easy and expeditious means of securing the broom-corn to the head may be attained than any that have hitherto been adopted or used. Moreover, when the broom shall have become so much worn as to be unfit for further use, all that will be necessary to produce a new broom will be the substitution of new broom-corn for the old.

Figure 2:
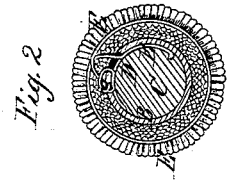
Figure 2 is a cross-section through the head showing the manner in which the broom-corn is bound around and upon the head.
Figure 1:
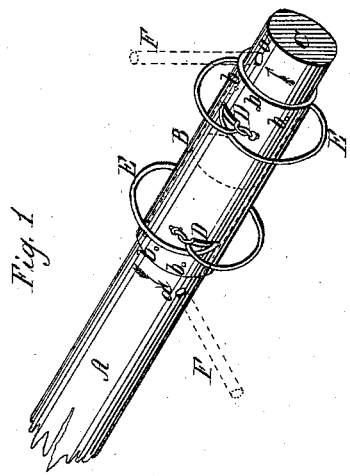
Figure 1 is a perspective view of a portion of the broom-handle, and the head adjusted to receive the broom-corn or other material used in the construction of a broom.

A, in the drawing, is the broom-handle. B is a ferrule or hollow metallic cylinder, which receives for half of its length the end of the handle A, this being fitted to turn easily but not too loosely in the cylinder. C is a plug of the same size as the handle, and fitting the other half of the cylinder in the same way, its inner end meeting and abutting against the end of the handle, while the outer end projects far enough to afford means for turning it. A hole, $a$, is made in the handle and plug near the ends of the cylinder, into which rods of stout wire may be inserted to serve as wrenches in turning them. The direction given to the handle and plug in turning them for binding is indicated by the arrows, fig. 1. Near each end of the cylinder is a slot, D D. To the cylinder near the slots are attached the binding-wires E E, which, starting in opposite directions, are made to entirely surround the cylinder at some distance therefrom, and passing the points of attachment are projected through the slots into the interior of the cylinder, where they are secured respectively to the handle A and the plug C, as seen in fig. 2. The space between the wires and the cylinder should be sufficient to allow the proper amount of broom-corn to be placed therein to form the broom. Small holes $b\ b$ are made at intervals around the cylinder, near each end, through which tacks or small nails may be driven into the handle and plug to prevent them from turning back after the wires have been drawn tight around the corn. When the space between the wires and the cylinder has been filled with broom-corn, or whatever else may be used for the same purpose, wrenches F F, shown in dotted lines, fig. 1, are inserted into the holes $a$ and the handle and plug are turned against each other, drawing the wires E E tightly around the corn and binding it securely to the head, when the handle and plug may be fixed by tacks, as set forth. Channels are cut around the handle and plug to receive the wires as they wind around within the cylinder.

Having thus fully described my invention, what I claim as new therein, and desire to secure by Letters Patent, is—

The cylinder B and binding-wires or cords E, arranged substantially as described, in combination with the broom-handle A and plug C, with their adjuncts, the holes $b\ b$ and $a$, substantially as and for the purposes set forth.

The above specification signed by me this 20th day of December, 1866.

HIRAM BARKER.

Witnesses:
    LOUIS M. FOULK,
    W. H. COBB.